United States Patent [19]
Witham et al.

[11] Patent Number: 5,174,438
[45] Date of Patent: Dec. 29, 1992

[54] CONVEYOR BELT PARTS AND ASSEMBLY

[75] Inventors: Robert Witham; Edward J. Stevenson, both of Napier, New Zealand

[73] Assignee: Flextrak Ltd., Napier, New Zealand

[21] Appl. No.: 781,766

[22] Filed: Oct. 23, 1991

[51] Int. Cl.⁵ ............................................. B65G 17/40
[52] U.S. Cl. ...................................... 198/851; 198/853
[58] Field of Search ................................. 198/853, 851

[56] References Cited

U.S. PATENT DOCUMENTS

| | | | |
|---|---|---|---|
| 685,115 | 10/1901 | Dodge | 198/853 |
| 1,224,445 | 5/1917 | Burpee | 198/53 |
| 2,363,932 | 11/1944 | Beers | 198/853 X |
| 3,726,569 | 4/1973 | Maglio et al. | 148/853 X |
| 4,080,842 | 3/1978 | Lapeyre et al. | 198/853 X |
| 4,220,052 | 9/1980 | Sheldon | 198/853 X |
| 4,406,036 | 9/1983 | Nijhuis | 198/853 X |
| 4,993,544 | 2/1991 | Bailey et al. | 198/853 X |
| 5,083,659 | 1/1992 | Bode et al. | 198/853 |

FOREIGN PATENT DOCUMENTS

| | | | |
|---|---|---|---|
| 0201317 | 11/1986 | European Pat. Off. | 198/853 |
| 325929 | 3/1930 | United Kingdom | 198/853 |
| 576997 | 4/1946 | United Kingdom | 198/853 |

Primary Examiner—D. Glenn Dayoan
Attorney, Agent, or Firm—Blakely, Sokoloff, Taylor & Zafman

[57] ABSTRACT

A conveyor belt that is constructed from a plurality of adjacent slabs. Each slab has a plurality of lugs on one side and a plurality of hooks on the other side of the slab. The lugs and hooks extend from a center plate section which provides the support surface for the products that are to be moved by the conveyor. Each slab has a pintle that is inserted into the lugs while the slab is still in a heated super plastic state. Subsequent cooling of the slab causes the lugs to shrink around the pintle such that the pintle is securely fastened to the slab. The pintle extends between the lugs so that the hooks of an adjacent slab can be inserted into the pintle to attach the adjoining slab.

26 Claims, 3 Drawing Sheets

CONVEYOR BELT PARTS AND ASSEMBLY

BACKGROUND OF THE INVENTION

1. Field of the Invention

This invention relates to slabs that can be Combined to create conveyor belts, that are typically used in the manufacturing industry to move products from location to location.

2. Description of Related Art

Conveyor belts are typically constructed from a plurality of pieces or slabs that are joined together along adjacent sides. To attach the slabs, each piece usually has a plurality of lugs on each side that align, so that a pin can be inserted through the lugs to attach the slabs together. Once such type of conveyor belt is shown and disclosed in U.S. Pat. No. 4,080,842 issued to Lapeyre et al. To repair the Lapeyre conveyor, the pins must be removed. Pin removal is usually time consuming and difficult, typically requiring the partial destruction of the head of the pin or the lugs.

New Zealand Patent No. 599,590 issued to Napier Tool & Die Co. Ltd., discloses a slab used to construct conveyor belts, that has a molded pintle on one side and a plurality of hooks on the other side of the slab. The molded pintle is inserted into the hooks of an adjacent slab, thereby adjoining the two slabs together. This process is repeated until the desired length of conveyor is created. The slots within the hooks are slightly smaller than the diameter of the pintle, so that the adjacent slab "snaps" onto the adjoining slab. The insertion and removal of each individual slab can be done manually without the need for any tools, making assembly and repair of the belt much easier and quicker than prior conveyors. The ability to insert each slab also allows the end user to assemble a belt of varying lengths, providing greater flexibility in the layout of the conveyor system.

The Napier belt is driven by sprockets that move the slabs in a loop. As the slabs encircle the sprockets, the hooks will move relative to the pintle which may cause excessive wear on the pintle. It would therefore be desirable to incorporate a pintle in a Napier type belt that is made from a material harder than the slab.

SUMMARY OF THE INVENTION

The present invention is a conveyor belt that is constructed from a plurality of adjacent slabs. Each slab has a plurality of lugs on one side and a plurality of hooks on the other side of the slab. The lugs and hooks extend from a center plate section which provides the support surface for the products that are to be moved by the conveyor. Each slab has a pintle that is inserted into the lugs while the slab is still in a heated state. Subsequent cooling of the slab causes the lugs to shrink around the pintle, such that the pintle is securely fastened to the slab. The pintle extends between the lugs so that the hooks of an adjacent slab can be inserted onto the pintle to attach the adjoining slabs. The pintle may be constructed from a material that is harder than the slab, thereby possibly reducing the wear on the pintle.

The slab is also provided with reinforcing ribs that extend from each lug and hook to the center section. The ribs reduce the stresses in the joining members and align the teeth of engaging sprockets with the slots of the connected slabs.

Therefore it is an object of this invention to provide a conveyor belt locking element that incorporates a separate pintle that can be constructed from a material that is harder than the slab.

It is also an object of this invention to provide a method of detaching conveyor belt slabs, without having to alter the pin, or use any special tools.

It is also an object of this invention to provide a conveyor belt locking element that is stronger than similar type locking elements that exist in the art.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
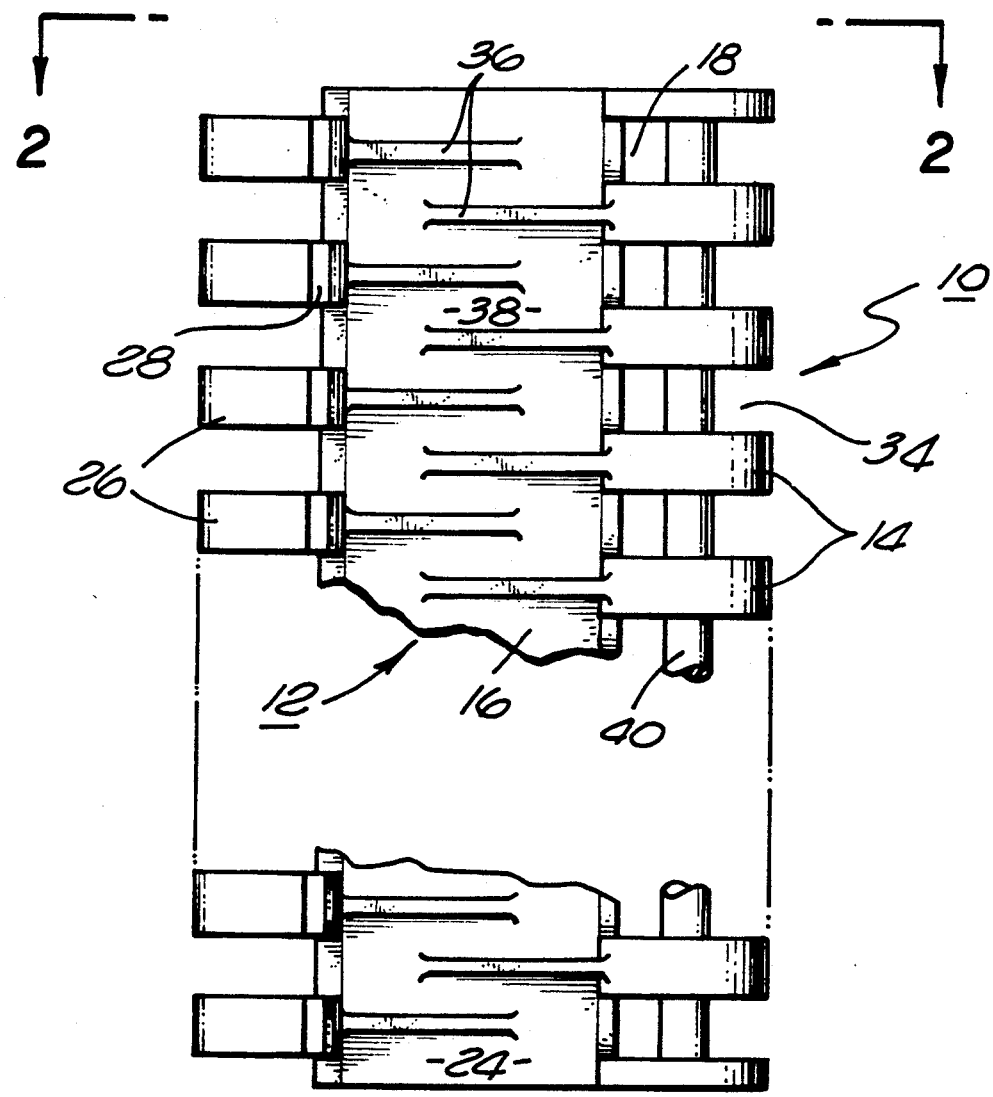
FIG. 1 is a bottom view of a conveyor belt locking element of the present invention.
Figure 2:
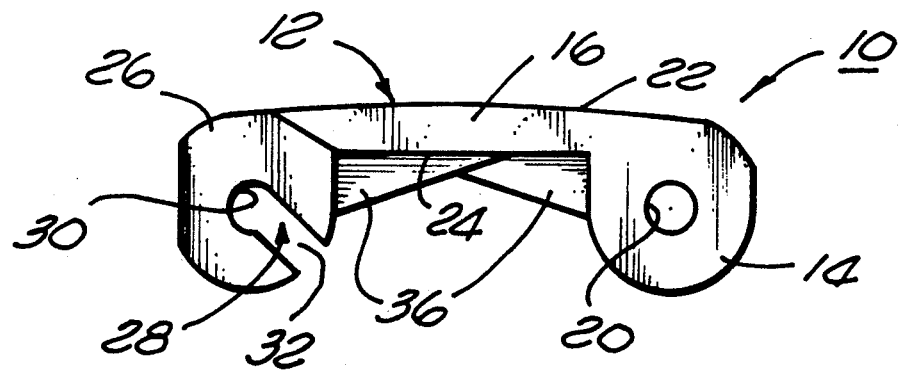
FIG. 2 is a side view of the locking element of FIG. 1.

Referring to the drawings more particularly by reference umbers, FIG. 1 shows a conveyor belt locking element 10 of the present invention. The locking element 10 includes a slab 12 that has a plurality of spaced apart first lugs 14 that extend from a center plate section 16, along a first side 18 of the plate 16. As shown in FIG. 2, the first lugs 14 have openings 20 that are coaxially aligned about a common axis. The center section 16 has a first surface 22 that provides a support surface for items that are to be moved by the resulting conveyor system. Opposite the first surface 22 is a second surface 24. Along the second side 26 of the plate 16 are a plurality of spaced apart second lugs 26, each with a slot 28. In the preferred embodiment, the slots 28 are formed by a hole 30 and an opening 32 that has a centerline that is located approximately 60 degrees relative to the first surface 22, as shown in FIG. 2. The first 14 and second 26 lugs are staggered so that each second lug 26 is in line with the space 34 between each first lug 14.

Extending from each first 14 and second 26 lug is a reinforcing rib 36. The reinforcing ribs 36 provide additional thickness between the lugs and plate 16, to decrease the stress and improve the strength at the point where the lugs are attached to the plate 16. The ribs 36 preferably have a cross section shaped as a right triangle, with the base portion of the triangle being adjacent to the lugs. The triangular shape provides a rib 36 that is both light and strong. The space 38 between the ribs 36 also creates a path that guides the teeth of the engaging sprockets into the slot 28, so that the sprocket can drive the locking element 10.

Figure 3:
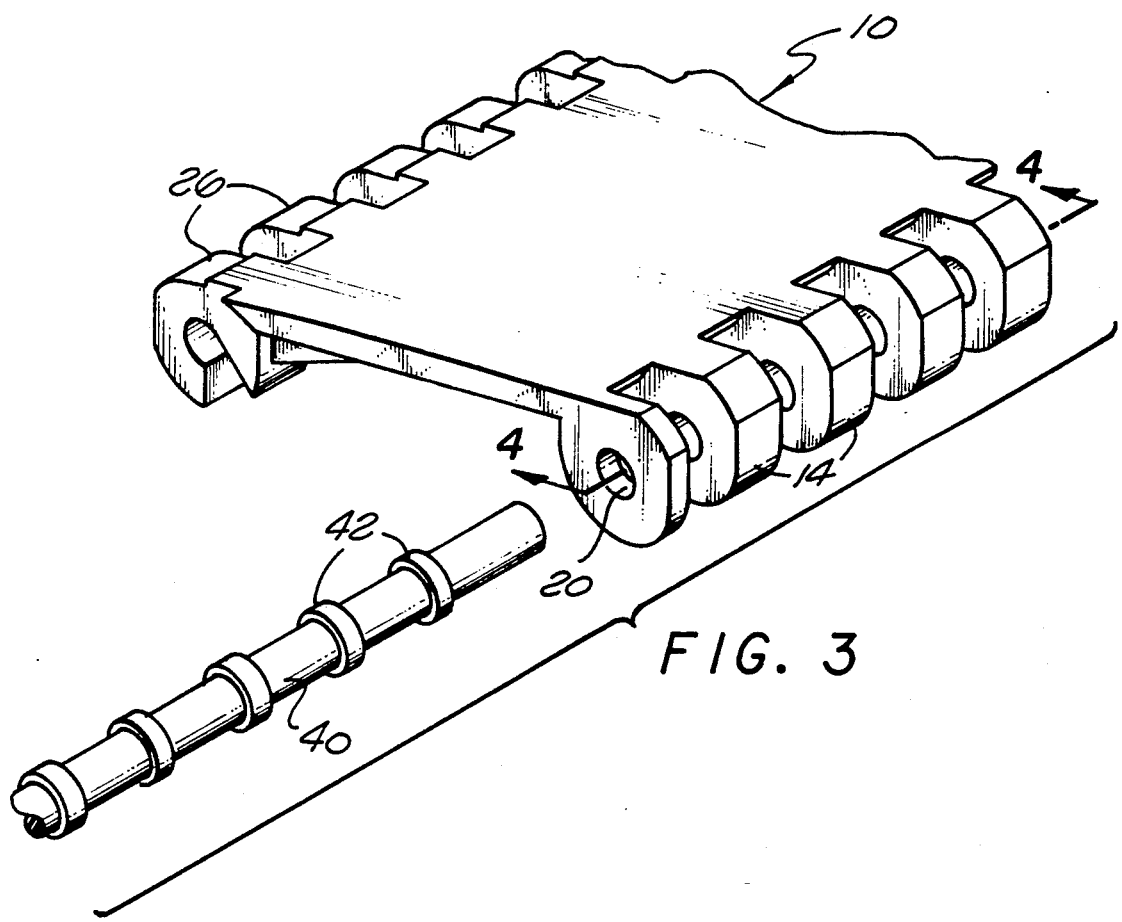
FIG. 3 is an exploded view of the slab and the pintle.
Figure 4:
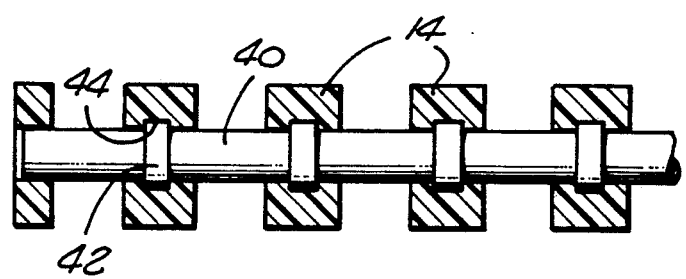
FIG. 4 is a cross sectional view showing the attachment of the pintle to the lugs of the slab.

Attached to the first lugs 14 is a pintle 40 that is typically cylindrical in shape. The pintle 40 extends between each first lug 14, wherein the second lugs 26 of another locking element 10 can be connected by inserting the pintle 40 into the slots 28 of the second lugs 26. To install the pintle 40 into the first lugs 14, a pintle 40 is provided that has a plurality of shoulders 42 along the longitudinal axis of the member 40 as shown in FIG. 3. The slab 12 is preferably constructed from plastic material including but not limited to an acetal copolymer, nylon, polyethylene or polypropylene. Such plastic materials are particularly useful for conveyor belts that carry food items. The plastic is typically molded in a form under heat and pressure to produce the slab 12. When the slab 12 is removed from the mold, the plastic is still at an elevated temperature, so that the slab 12 is still soft. In the alternative, a "cold" slab could be softened by heating the same. While the slab 12 is still soft, the pintle 40 is pushed into the holes 20 of the first lugs 14 until the shoulders 42 of the pintle 40 are in the centers of the first lugs 14. The slab 12 is allowed to cool to room temperature, wherein the plastic material contracts around the pintle 40, to firmly attach the first lugs 14 to the pintle 40, as shown in FIG. 4. The shoulders 42 of the pintle 40 create recesses 44 in the cooled plastic, such that the combination of shoulders 40 and recesses 44 prevent the pintle 40 from being removed or backing out of the lugs 14. Without limiting the present invention, it is believed that residual stresses exist in the plastic lugs 14 after the slab 12 has cooled. Although a pintle 40 with shoulders 42 is described and shown, it is to be understood that a pintle 40 without shoulders 42 could be assembled into the first lugs 14 with the method described above.

The pintles 40 may be constructed from a material that is harder than the material of the slab 12, to reduce the wear between the pintles 38 and the second lugs 26 of the adjoining locking element 10. To further improve bearing life of the pintle 40 and second lug 26, both members should preferably have smooth surfaces. The pintles 40 are preferably constructed from various hard plastics using known molding processes. Both the slabs 12 and pintles 40 may be constructed in various colors to indicate the type of material from which the members are made. This allows the end user to easily identify the type of locking element 10 and to match the element with the particular use that is desired. For instance, it is known that polyethylene is useful for applications in sub-zero temperatures, such as refrigeration or freezing processes. Polyethylene slabs may be colored blue, thereby providing an easy way of indicating that the polyethylene slabs are suitable for cold temperatures. Likewise, the pintle 38 may have a color different from the slab 12, wherein specific applications of a certain type of pintle material may be indicated by the color of the locking member 38. For instance a silver colored pintle may indicate high strength material, whereas a rust colored pintle may correspond to a material that is resistive to corrosion.

Figure 5:
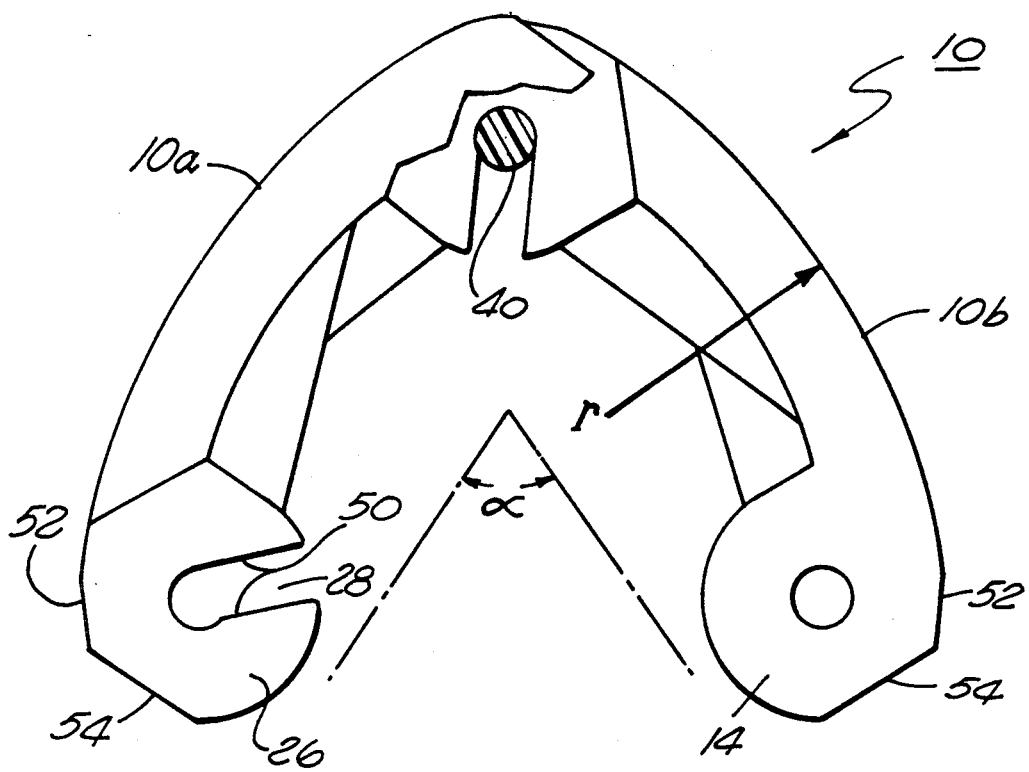
FIG. 5 is a side view of two adjacent slabs joined together by the insertion of the pintle into the hooks of an adjoining slab, the slabs being rotated relative to each other to show the angle of entry of the pintle into the hooks.

As shown in FIG. 5, the locking elements 10 can be joined together by inserting the pintle 40 of one element 10a into the slots 28 of another element 10b. In the preferred embodiment, the angle of entry α between the pintle 38 and the second lugs 26 is less than 90 degrees and preferably 60 degrees, although it is to be understood that any angle less than 180 degrees can be used. The angle of entry α is defined as the maximum angle allowable for two locking elements to be engaged and detached. Such an angular relationship prevents the locking elements from accidentally disengaging during use.

Figure 6:
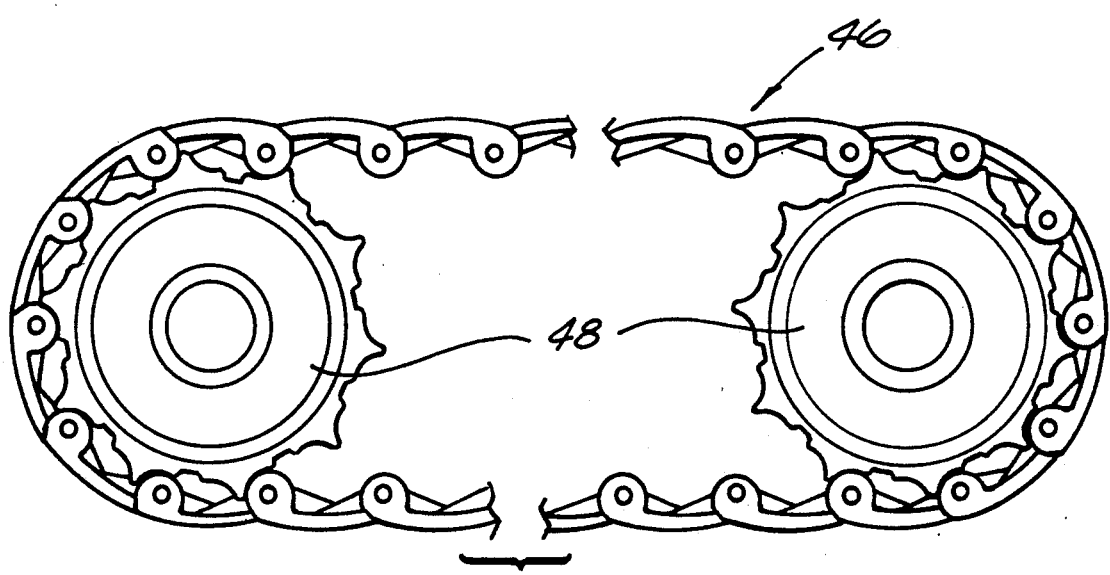
FIG. 6 is a side view showing a plurality of locking elements joined together to create a belt that is driven by rotating sprockets.

As shown in FIG. 6, the locking elements 10 can be connected to create a closed loop belt 46. The adjoining locking elements 10 can be coupled to sprockets 48 which mesh with the slots 28 and move the belt 46 in a circular path. Referring again to FIG. 5, the surfaces 50 of the slots 28 should be preferably parallel, so that the sprocket teeth are firmly engaged in the slots 28 to prevent any slippage of the belt 46.

In the preferred embodiment, the first 14 and second 26 lugs each have a first planar face 52 that is oblique to the first surface 22, and a second planar face 54 that is oblique to the first planar surface 50. The faces 52 and 54 are preferably constructed so that the second faces 54 are parallel when adjoining locking elements 10 rotate around the circumference of a sprocket 48. The plate 16 may also have a curvature r, as shown in FIG. 5. The curvature allows the belt 46 to be in close proximity with another belt or roller, without creating a space between the belts.

As shown in FIG. 1, the second surface 24 also has a chamfer 56 that allows the second lugs 26 of an adjacent slab to be in close proximity to the plate 16, without having interference between the adjacent lug 26 and the plate 16 when the locking elements rotate relative to each other. The close proximity of the second lugs and plate, also prevents the locking elements from being easily separated during use.

While certain exemplary embodiments have been described in detail and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A conveyor belt locking element, comprising:
a slab having a first and second surface and a plurality of first lugs extending from a first end of said slab and a plurality of second lugs extending from a second end of said slab, said first lugs each having an opening extending through said first lugs and said second lugs each having a slot; and,
a pintle extending through said openings and attached to said first lugs, said pintle being attached to said first lugs such that said pintle induces compressive stresses in said first lugs, said pintle extending between said first lugs so that said pintle can be inserted into said slots of said second lugs of an adjacent slab, whereby adjacent slabs can be connected.

2. The locking element as recited in claim 1, wherein said pintle has a plurality of shoulders that are each embedded into a corresponding first lug.

3. The locking element as recited n claim 1, wherein said pintle is constructed from a plastic that has a different hardness than said plastic of said slab.

4. The locking element as recited in claim 1, wherein said slab has a plurality of reinforcing ribs that extend form said first and second lugs along said second surface of said slab, said reinforcing ribs each having a cross section shaped as a right triangle with a base of said right triangle being adjacent to said corresponding lug.

5. The locking element as recited in claim 1, wherein adjacent slabs must be located at an angle less than 90 degrees relative to each other to insert said pintle into said slots.

6. The locking element as recited in claim 1, wherein said first and second lugs each have a first face adjacent to said first surface that extends from said first surface at an oblique angle, and a second face adjacent to said first face that extends from said first face at an oblique angle.

7. The locking element as recited in claim 1, wherein said slab has a radius of curvature.

8. A conveyor belt locking element, comprising:
a plastic slab having a first and second surface and a plurality of first lugs extending from a first end of said plastic slab and a plurality of second lugs extending from a second end of said plastic slab, said first lugs each having an opening extending through said first lugs, said second lugs each having a slot; and,
a pintle extending through said openings and attached to said first lugs such that residual stresses exist in said first lugs, said pintle having a plurality of shoulders each attached to a corresponding first lug, said pintle extending between said first lugs so that said pintle can be inserted into said slots of said second lugs of an adjacent slab, said slabs and said lugs being constructed such that adjacent slabs must be located at an angle less than 90 degrees relative to each other to insert said pintle into said slots.

9. The locking element as recited in claim 8, wherein said slab has a plurality of reinforcing ribs that extend from said first and second lugs along said second surface of said slab, said reinforcing ribs each having a cross section shaped as a right triangle with a base of said right triangle being adjacent to said corresponding lug.

10. The locking element as recited in claim 9, wherein said first and second lugs each have a first face adjacent to said first surface extending from said first surface at an oblique angle, and a second face adjacent to said first face extending from said first face at an oblique angle.

11. The locking element as recited in claim 10, wherein said pintle is constructed from a plastic that has a different hardness than said plastic of said slab.

12. The locking element as recited in claim 11, wherein said slab has a radius of curvature.

13. A conveyor belt, comprising:
a plurality of adjacent slabs each with a first and second surface, each said slab having a plurality of first lugs extending from a first end of said slab and a plurality of second lugs extending from a second end of said slab, said first lugs each having an opening extending through said first lugs and said second lugs each having a slot; and,
a plurality of pintles extending through said openings and attached to said first lugs of said slabs, said pintle being attached to said first lugs such that said pintle induces compressive stresses in said first lugs, each said pintle extends between said first lugs such that said pintle is located within said slots of said second lugs of said adjacent slab, wherein said pintles and said second lugs join said adjacent slabs.

14. The conveyor belt as recited in claim 13, wherein said pintles have a plurality of shoulders that are each embedded into a corresponding first lug.

15. The conveyor belt as recited in claim 14, wherein said pintles are constructed from a plastic that is harder than said plastic of said slabs.

16. The conveyor belt as recited in claim 15, wherein said slabs each have a plurality of reinforcing ribs that extend from said first and second lugs along said second surface of said slabs, said reinforcing ribs each having a cross section shaped as a right triangle with a base of said right triangle being adjacent to said corresponding lug.

17. The conveyor belt as recited in claim 16, wherein said adjacent slabs must be located at an angle less than 90 degrees relative to each other to insert said pintle into said slots.

18. The conveyor belt as recited in claim 17, wherein said first and second lugs each have a first face adjacent to said first surface that extends from said first surface at an oblique angle, and a second face adjacent said first face that extends from said first face at an oblique angle.

19. The conveyor belt as recited in claim 18, wherein each said slab has a radius of curvature.

20. A method of constructing a conveyor belt locking element, comprising the steps of:
providing a slab having a first and second surface and a plurality of first lugs extending from a first end of said slab and a plurality of second lugs extending from a second end of said slab, said first lugs each having an opening extending through said first lugs and said second lugs each having a slot, said slab being at an elevated temperature wherein said slab is deformable, said slab having a characteristic of shrinking when said temperature of said slab is lowered;
inserting a pintle through said openings of said first lugs; and,
cooling said slab such that said first lugs shrink and become rigidly attached to said pintle, said pintle being attached to said first lugs such that said pintle induces compressive stresses in said first lugs.

21. The method as recited in claim 20, wherein said slab is constructed from plastic.

22. The method as recited in claim 21, wherein said pintle has a plurality of shoulders that are each embedded into a corresponding first lug.

23. The method as recited in claim 22, wherein said pintle is constructed form a plastic that has a different hardness than said plastic of said slab.

24. The method as recited in claim 23, wherein said slab has a plurality of reinforcing ribs that extend from said first and second lugs along said second surface of said slab, said reinforcing ribs each having a cross section shaped as a right triangle with a base of said right triangle being adjacent to said corresponding lug.

25. The method as recited in claim 24, wherein adjacent slabs must be located at an angle less than 90 degrees relative to each to insert said pintle into said slots.

26. The method as recited in claim 25, wherein said first and second lugs each have a first face adjacent to said first surface that extends from said first surface at an oblique angle, and a second face adjacent said first face that extends from said first face at an oblique angle.

* * * * *

UNITED STATES PATENT AND TRADEMARK OFFICE
CERTIFICATE OF CORRECTION

PATENT NO. : 5,174,438
DATED : 12/29/92
INVENTOR(S) : Witham et al.

It is certified that error appears in the above-identified patent and that said Patent is hereby corrected as shown below:

| | | |
|---|---|---|
| Col. 02, line 34 | delete "umber" | insert --number-- |
| Col. 04, line 55 | delete "n" | insert --in-- |
| Col. 04, line 60 | delete "form" | insert --from-- |
| Col. 06, line 46 | delete "form" | insert --from-- |

Signed and Sealed this

Eighth Day of March, 1994

Attest:

BRUCE LEHMAN

Attesting Officer

Commissioner of Patents and Trademarks